United States Patent Office 3,551,569
Patented Dec. 29, 1970

3,551,569
ANTIBACTERIAL COMPOSITION CONTAINING 2,6-DIAMINOPHENYL PENICILLIN OR SALT THEREOF
Peter Baumann, Fullinsdorf, Basel-Land, and Markus Zimmermann, Riehen, near Basel, Switzerland, assignors to Geigy Chemical Corporation, Greenburgh, N.Y., a corporation of Delaware
No Drawing. Original application Aug. 30, 1965, Ser. No. 483,827. Divided and this application Mar. 26, 1969, Ser. No. 833,225
Int. Cl. A61k 21/00
U.S. Cl. 424—271
4 Claims

ABSTRACT OF THE DISCLOSURE

Antibacterial compositions comprising 2,6-diaminophenyl penicillin or a salt thereof, and a carrier.

CROSS REFERENCE

This is a division of Ser. No. 483,827, filed Aug. 30, 1965.

DETAILED DESCRIPTION

This relates to new chemo-therapeutically valuable penicillin derivatives.

Penicillins such as benzyl penicillin (=Penicillin G) or phenoxymethyl penicillin (=Penicillin V), which have been known for a considerable time, have proved to be very effective for the treatment of infections caused by gram positive bacteria. They have the disadvantage, however, that they are ineffective against the so-called penicillin resistant strain Staphylococcus aureus which cause the enzymepenicillinase.

However, now that 6-amino-penicillanic acid as the basic structure of all penicillins has become accessible, attempts have been made to find new, semisynthetic penicillins which are effective against the resistant strains of Staphylococcus aureus, 2,6-dimethoxyphenyl penicillin (Methicillin), which has been on the market for a considerable time, has this property. However, it suffers from the drawback that it is not absorbed via the gastro-intestinal tract, it is not stable in the presence of acid and has a limited range of action; thus its mode of application and its range of application are limited.

It has now surprisingly been found that 2,6-diaminophenyl penicillin, of the fromula

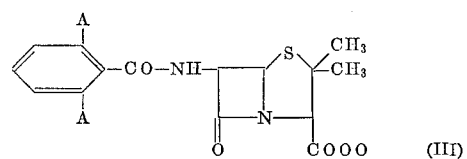

and its pharmaceutically acceptable salts with inorganic and organic bases have excellent antibacterial activity against gram positive and some gram negative bacteria. 2,6-diaminophenyl penicillin has a broad range of action hitherto unknown for penicillins in that it is both active against resistent Staphylococci life Methicillin but that, at the same time, it is also effective against gram-negative bacteria, showing an activity in this respect which is similar to that of Ampicillin. Ampicillin itself has no effect on resistant Staphylococci; Methicillin, on the other hand, has none against gram-negative bacteria.

2,6-diaminophenyl penicillin and its salts are produced by known methods, but in the work-up and salt formation, the hybrid ion properties of the end product should be borne in mind.

In order to obtain 2,6-diaminophenyl penicillin, 6-amino-penicillanic acid or a salt thereof is reacted with an acid halide, anhydride or azide or with an activated ester of an acid of the general formula

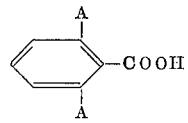

wherein
A represents the amino group or a grouping containing nitrogen which grouping can be converted into an amino group by catalytically activated hydrogen, to form a 6-acylamino penicillanic acid (aryl penicillin) of the general formula

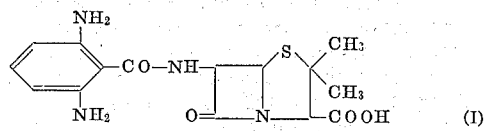

wherein
A has the meaning given above and the latter or a salt thereof is converted to 2,6-diaminophenyl penicillin or a basic salt thereof while converting the grouping A into the amino group by catalytically activated hydrogen.

To produce salts with organic bases, for example those given below, the sodium or potassium 6-acylamino penicillanate can be reacted, e.g., with the free acids in organic solvents or the alkali salts of the acids can be brought together with salts of the organic bases, e.g., the hydrochlorides, in water and the salts which precipitate can be isolated and dried.

Salts of 2,6-diaminophenyl penicillin according to the invention which can be produced in this manner are, for example, the sodium, potassium, ammonium, magnesium or calcium salts, or salts of organic bases such as diethylamine, triethylamine, diethanolamine, N-ethyldiethanolamine, pyrrolidine, piperidine, N-ethyl-piperidine, 1-(β-hydroxyethyl)-piperidine, morpholine, procain, benzylamine, di-benzylamine, 1-phenylpropyl-(2)-amine and other amines which are often used for the production of penicillin salts.

The following nonlimitative examples illustrate the invention further. The temperatures are given therein in degrees centigrade.

EXAMPLE 1

(a) 1.0 g. of 2,6-dinitrobenzoic acid is dissolved in 5 ml. of thionyl chloride and the solution is refluxed for 30 minutes. The excess thionyl chloride is evaporated in vacuo, the residue is dissolved in benzene and the benzene solution boiled down. The residue is dried for 1 hour in vacuo. The resulting crude acid chloride is used for the following reaction.

(b) 1.16 g. of 86.1% 6-amino-penicillanic acid are suspended in 30 ml. of anhydrous chloroform and 2 ml. of triethylamine and the suspension is stirred for 30 minutes at room temperature (20°). The solution is filtered and the filtrate cooled to 0°. The acid chloride, dissolved in 10 ml. of chloroform, is then added dropwise within 5 minutes and the reaction mixture is stirred for 1 hour at room temperature. The clear, pale yellow solution is boiled down in a rotary evaporator (water bath temperature 35°) and the residue is dissolved in 30 ml. of water and 50 ml. of methylisobutyl ketone. The pH of the aqueous phase is adjusted to 2.1 with 10 N sulphuric acid while stirring and the phases are separated. The aqueous phase is extracted with 5 ml. of methylisobutyl ketone. The methylisobutyl ketone extracts are combined, washed with 5 ml. of water and dried with sodium sulphate. The methylisobutyl ketone solution is then extracted with sufficient 3% sodium bicarbonate solution to impart to the aqueous phase a pH of 6.8–7.0. The phases are separated and the organic phase is again extracted with 5 ml. of water. The combined aqueous phases are washed with 25 ml. of ether and freed from dissolved ether in a rotary evaporator. The clear and almost colourless solution of 2,6-dinitrophenyl penicillin sodium obtained in this way is evaporated at a low temperature under high vacuum or lyophilised. The product, a white voluminous powder, shows in the IR spectrum (potassium bromide) a strong band at $5.65\mu$ which is typical of the $\beta$-lactam ring.

(c) In order to reduce the nitro groups of the last-mentioned compound, 2.7 g. of the latter are dissolved in 150 ml. of distilled water and the solution is hydrogenated with 1.5 g. of palladium on charcoal (5% Pd) at room temperature and slight excess hydrogen pressure. Hydrogen absorption ceases completely after about 3 to 4 hours. Up to this point, 841 ml. of hydrogen have been absorbed which corresponds to 6 moles for each equivalent weight of 2,6-dinitrophenyl penicillin.

The solution is then filtered and lyophilised whereupon 2,6-diaminophenyl penicillin sodium remains as a pale grey amorphous powder. In the IR spectrum the powder shows the characteristic bands for the lactam ring at $5.65\mu$.

(d) Bacteriological properties of 2,6-diaminophenyl penicillin sodium obtained according to (c) and illustrated by the following:

In the incorporation test, the minimal concentrations which inhibit various Staphylococcus strains are:

| Staphylococcus strain— | Concentration in $\mu$g./ml. |
| --- | --- |
| Aureus Geigy 5002 (r) | 10 |
| Aureus Geigy 5005 (r) | 10 |
| Lactia NCTC 8340 (s) | 0.1–1 |
| Aureus Smith (s) | 1 |

(r)=resistant, (s)=sensitive to Penicillin G.

The minimal concentrations required for inhibiting growth of the following two gram negative bacterial strains in the agar incorporation test are: *Escherichia coli* NCTC 86: 12.5 $\mu$g./ml.; *Shigella flexneri* NCTC 8192: 3.12 $\mu$g./ml.

In an in vivo test albino mice were injected intraperitoneally with about 350 million living *Staphylococcus aureus* bacteria of a highly resistant strain (Geigy 5001). 69 mg./kg. of 2,6-diaminophenyl penicillin sodium, administered intramuscularly, cured half the animals (=$CD_{50}$). The highest dosage of Penicillin G administered (400 mg./kg.) was ineffective.

EXAMPLE 2

1.5 g. of 2,6-diaminobenzoic acid dihydrochloride are suspended in 20 ml. of acetone and 24 ml. of dioxan and then 2.8 ml. of triethylamine and 0.86 ml. of chloroformic acid isobutyl ester are added at about 3°. After stirring for 30 minutes at 0°, the mixture is filtered and the filtrate is added to a solution of 2.11 g. of triethyl ammonium 6-amino-penicillanate in 50 ml. of chloroform and 2 ml. of triethylamine. After stirring for 15 minutes at 0° and then for 45 minutes at 24°, it is evaporated under water jet vacuum (12 torr), the oily residue is dissolved in 100 ml. of n-butanol and the solution is filtered. A slight excess of the calculated amount of potassium $\alpha$-ethyl caproate is added to the yellow filtrate and, to enhance formation of precipitate, it is diluted with anhydrous ether. 2,6-diaminophenyl penicillin potassium gradually flakes out. It is separated from the mother liquor in a centrifuge and dried over phosphorus pentoxide in vacuo.

The grey powder, 0.82 g., shows the characteristic $\beta$-lactam bands in the IR spectrum (KBr) at $5.65\mu$. Its antibiotic properties are similar to those of the product described in Example 1.

EXAMPLE 3

1.67 g. of p-nitrophenyl-2,6-dinitrobenzoate, produced from the 2,6-dinitrobenzoyl chloride, described in Example 1(a), are dissolved in 15 ml. of pure chloroform and the solution is added dropwise to a solution, kept at 0°, of 1.59 g. of triethyl ammonium 6-amino-penicillanate and 0.6 ml. of triethylamine in 25 ml. of chloroform. The whole is then stirred for 2 hours at room temperature. After concentrating in a rotary evaporator, the product is worked up analogously to Example 1(b) and 2,6-dinitrophenyl penicillin sodium is obtained as a white amorphous powder.

The invention also concerns new antibacterial agents. These contain, as active ingredient, 2,6-diaminophenyl penicillinic acid of Formula I or at least one nontoxic monobasic salt thereof in suitable form for oral, rectal, local or parenteral administration. Suitable nontoxic salts are those with pharmacologically acceptable inorganic and organic bases, i.e., with bases the cations of which, in dosages at which the compounds according to the invention are effective, have no physiological effect themselves or have a beneficial action, particularly a local anaesthetic action in the case of parenteral administration. For example, the salts with the bases mentioned hereinbefore can be used.

Dosage units for peroral administration preferably contain between 10% and 90% of the acid of Formula I or of a nontoxic salt thereof. They are produced by combining the active substance with, e.g., solid, pulverulent carriers such as lactose, saccharose, sorbitol, mannitol; starches such as potato starch, maize starch or amylopectin; also laminaria powder or citrus pulp powder; cellulose derivatives or gelatines, optionally with the addition of lubricants such as magnesium or calcuim stearate or polyethylene glycols (Carbowaxes) of suitable molecular weights, to form tablets or dragée (sugar coated tablet) cores. The latter are coated, e.g., with concentrated sugar solutions which can also contain gum arabic, talcum and/or titanium dioxide, or with a lacquer dissolved in easily volatile organic solvents or mixtures of solvents. Dye-stuffs can be added to these coatings, e.g., to distinguish between various dosages of active substance.

Dosage units for rectal administration are, e.g., suppositories which consist of a combination of an acid of the general Formula I or of a suitable nontoxic salt thereof with a neutral fatty foundation, or also gelatine rectal capsules which contain a combination of the active ingredient or a suitable salt thereof with polyethylene glycols (Carbowaxes) of suitable molecular weight.

Dry ampoules for the preparation of preferably 5–15% weight/volume aqueous solutions for parenteral, particularly intravenous, intramuscular or subcutaneous administration, contain a water-soluble nontoxic salt of the acid of Formula I, optionally together with suitable stabilising agents and buffer substances.

Also ointments and powders can be used for the local treatment of infections. These forms of application can be prepared with the carriers, diluents and additives conventionally used for this purpose.

The therapeutically active compounds according to the invention can be administered in oral dosages as high as 300 mg.

The following nonlimitative examples illustrate the production of tablets and dragées.

EXAMPLE 4

250 g. of 2,6-diaminophenyl penicillin or its sodium or potassium salt are mixed with 175.80 g. of lactose and 169.70 g. of potato starch. The mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicon dioxide are mixed in and the mixture is pressed into 10,000 tablets, each weighing 110 mg. and containing 25 mg. of active substance. If desired, the tablets can be grooved to permit closer adaptation of the dosage.

EXAMPLE 5

A granulate is prepared from 250 g. of the active substance used in Example 4, 175.90 g. of lactose and the alcoholic solution of 10 g. of stearic acid. The granulate, after drying, is mixed with 56.60 g. of colloidal silicon dioxide, 165 g. of talcum, 20 g. of potato starch and 2.50 g. of magnesium stearate and pressed into 10,000 dragée cores. These are then coated with a concentrated syrup made from 502.28 g. of crystallised saccharose, 6 g. of shellac, 10 g. of gum arabic, 0.22 g. of dye-stuff and 1.5 g. of titanium dioxide and dried. The dragées obtained each weigh 120 mg. and contain 25 mg. of active substance.

We claim:

1. An antibacterial pharmaceutical composition comprising an antibacterially effective amount of 2,6-diaminophenyl penicillin or a pharmaceutically acceptable monobasic salt thereof and a pharmaceutically acceptable carrier.

2. An antibacterial pharmaceutical composition according to claim 1, said composition being adapted for peroral administration and comprising a solid pulverulent pharmaceutically acceptable carrier.

3. An antibacterial pharmaceutical composition according to claim 2 wherein the sodium salt of 2,6-diaminophenyl penicillin is employed.

4. An antibacterial pharmaceutical composition according to claim 2 wherein the potassium salt of 2,6-diaminophenyl penicillin is employed.

References Cited

UNITED STATES PATENTS 2,951,836  9/1960  Doyle et al. _____ 260—239.1

JEROME D. GOLDBERG, Primary Examiner